United States Patent [19]

Neubauer et al.

[11] Patent Number: 5,237,891

[45] Date of Patent: Aug. 24, 1993

[54] ELECTRONIC FOOT PEDAL HAVING IMPROVED BIASING ARRANGEMENT

[75] Inventors: Chester E. Lundberg, Sherwood; Keith A. Neubauer, Milwaukie; Christopher D. Nordeen, Portland, both of Oreg.

[73] Assignee: Williams Controls, Inc., Portland, Oreg.

[21] Appl. No.: 870,518

[22] Filed: Apr. 16, 1992

Related U.S. Application Data

[62] Division of Ser. No. 641,190, Nov. 15, 1991, Pat. No. 5,133,225.

[51] Int. Cl.⁵ ............................................. G05G 1/14
[52] U.S. Cl. ......................................... 74/560; 74/561; 74/512; 74/514; 338/153; 200/61.89
[58] Field of Search ............. 74/560, 561, 512, 513, 74/514; 338/153; 200/61.89; 267/156, 154, 272

[56] References Cited

U.S. PATENT DOCUMENTS

| | | | |
|---|---|---|---|
| 1,099,646 | 6/1914 | Gresser | 267/272 |
| 1,830,441 | 11/1931 | Mulhollen | 74/513 |
| 2,042,202 | 5/1936 | Althouse | 74/513 X |
| 2,379,774 | 7/1945 | Wyer | 338/153 |
| 2,713,820 | 7/1955 | Horii | 267/156 X |
| 2,797,431 | 7/1957 | Loria | 267/156 X |
| 2,934,785 | 5/1960 | Heuer | 267/156 X |
| 3,229,792 | 1/1966 | Hock | 74/560 |
| 3,481,216 | 12/1969 | Noriega | 74/560 |
| 3,769,852 | 11/1973 | Peifer et al. | 74/512 |
| 4,161,341 | 7/1979 | Reinecke et al. | 74/512 X |
| 4,179,949 | 12/1979 | Hildebrecht | 74/560 X |
| 4,510,064 | 4/1985 | Klatt | 74/560 X |
| 4,528,590 | 7/1985 | Bisaquino et al. | 338/153 |
| 4,695,819 | 9/1987 | Bowsher | 74/512 X |
| 4,958,607 | 9/1990 | Lundberg | 74/513 X |
| 4,976,166 | 12/1990 | Davis et al. | 74/560 X |
| 5,062,317 | 11/1991 | Saliba | 74/560 |
| 5,133,225 | 7/1992 | Lundberg et al. | 74/560 |

FOREIGN PATENT DOCUMENTS

1395021 5/1975 United Kingdom ............... 74/560

*Primary Examiner*—Vinh T. Luong
*Attorney, Agent, or Firm*—Robert L. Harrington

[57] ABSTRACT

An electronic foot pedal for outputting an electrical signal proportional to the degree a treadle is pivoted. The electronic foot pedal has an improved spring arrangement for yieldably biasing the treadle toward its home position. Dual springs are provided, independently mounted and supplementary to each other. Each spring has an adequate biasing force to urge the treadle to its home position. The springs are of a ribbon-like material that are wound into a flat spiral. The springs are subjected mainly to bending forces and have flexure as the treadle is pivoted to its pivotal limits.

3 Claims, 2 Drawing Sheets

ELECTRONIC FOOT PEDAL HAVING IMPROVED BIASING ARRANGEMENT

This is a divisional of co-pending application Ser. No. 07/641,190 filed on Jun. 15, 1991 now U.S. Pat. No. 5,133,255 issued Jul. 28, 1992.

BACKGROUND INFORMATION

1. Field of the Invention

This invention relates to electronic foot pedals for outputting electronic signals for controlling engine RPM and in particular it relates to an adjustable cam actuated idle validation switch.

2. Background of the Invention

Modern engines for trucks utilize electronic foot pedals that output a signal proportional to treadle displacement. The signal is input to an engine controller which controls, as one of its functions, the speed of the engine.

The electronic foot pedals are preferably provided with an idle validation switch. The idle validation switch is activated when the pedal is returned to its idle or home position. The idle validation switch overrides the signal generated by treadle displacement to ensure the idle setting.

One of the problems in assembling the idle validation switch to the treadle is to precisely position the switch so that it is activated at the home position and only at the home position of the treadle.

BRIEF SUMMARY OF THE INVENTION

In the preferred embodiment of the present invention, the treadle has a pivot arm that is pivoted as the pedal is displaced. An idle validation switch is mounted to the treadle adjacent the pivot arm. The pivot arm has a cam surface and the switch is plunger-activated with the plunger engaging the cam surface. As the pivot arm is pivoted, the plunger is axially moved by the cam surface to open and close the idle validation switch. The cam surface is provided on a screw head of an adjusting screw with the shaft of the screw engaged in a threaded bore in the pivot arm. Adjustment of switch actuation is enabled by screwing in and screwing out the threaded shaft of the adjusting screw.

Whereas the disclosure herein of the electronic foot pedal has been condensed as compared to the parent case to satisfy Patent Office requirements, the parent case, Ser. No. 07/641,190 filed Jun. 15, 1991, now U.S. Pat. No. 5,133,255 is incorporated in its entirety herein by reference.

DESCRIPTION OF THE PREFERRED EMBODIMENT

Figure 1:
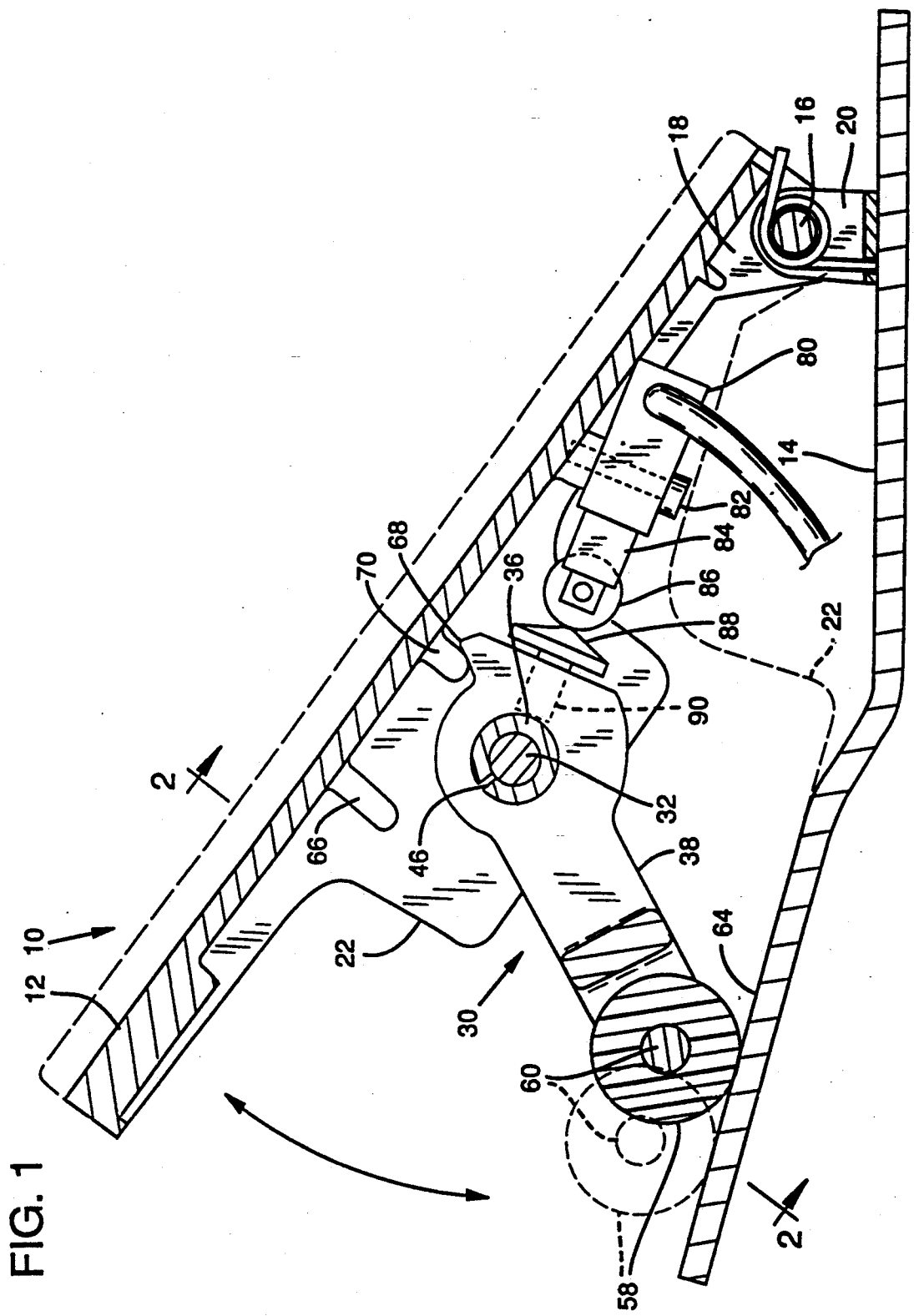
FIG. 1 is a view of electronic foot pedal provided with an adjustable idle validation switch in accordance with this invention.
Figure 2:
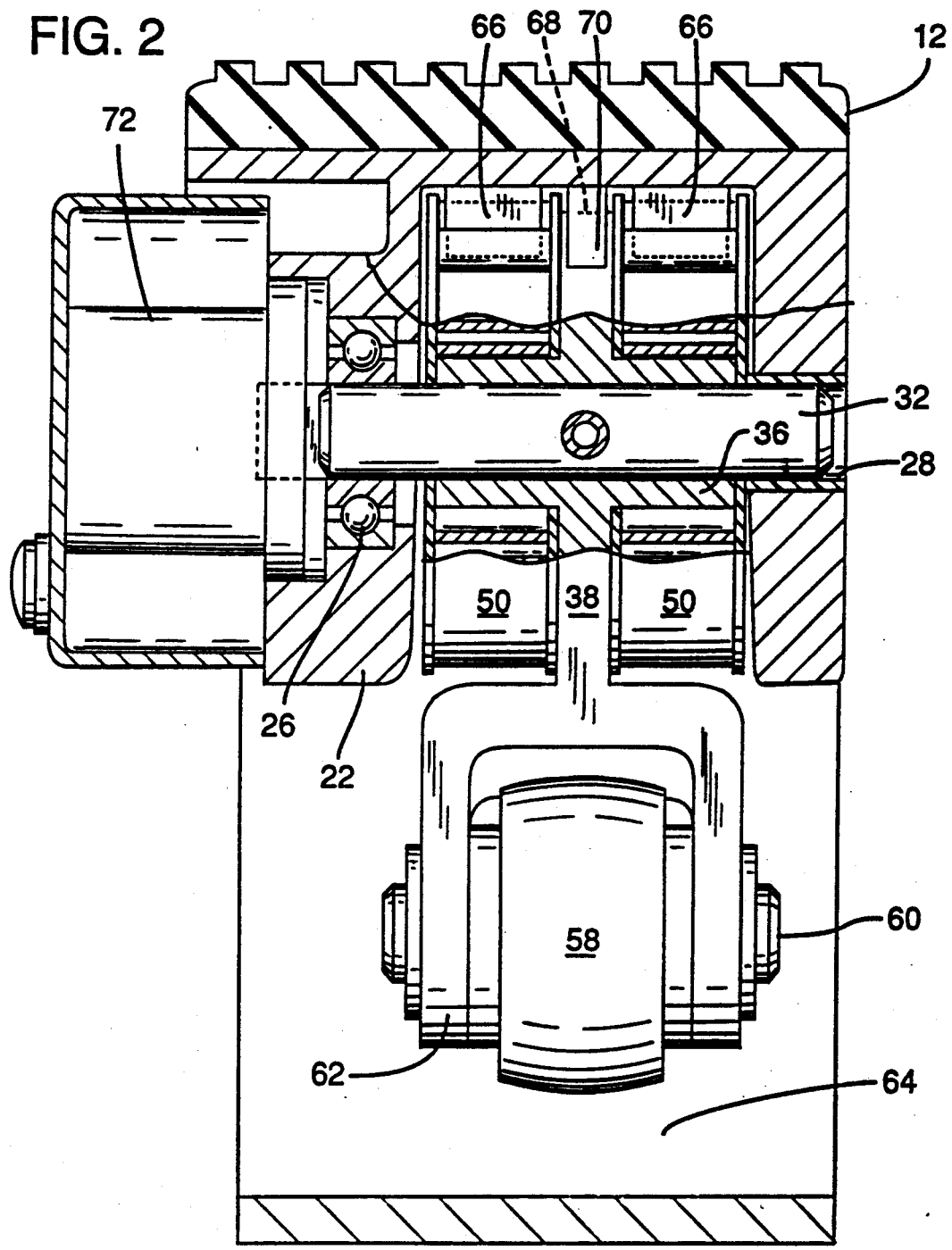
FIG. 2 is a view along view lines 2—2 of FIG. 1.

FIGS. 1 and 2 illustrate an assembled electronic foot pedal 10. The pivot arm 30 is pivotally mounted to a treadle 12 and is disposed between a treadle 12 and a base 14. As shown, the roller 58 of a arm 30 is in contact with an inclined track portion 64 of the base 14. A potentiometer 72 (see FIG. 2) is adjustably mounted to the treadle 12 and has a moveable member (not shown) coupled to the pivot shaft 32. As the treadle 12 is pivoted relative to the base 14, either toward or away from, the pivot arm 30 is pivoted relative to the treadle 12 by the roller 58 moving on the inclined track portion 64 of the base 14. This causes the pivot shaft 32 to rotate relative to the treadle 12 and being coupled to the potentiometer 72 (shown in FIG. 2) rotates the moveable member of the potentiometer the same degree as the shaft 32 is rotated to change the output signal. The electronic foot pedal 10 has mechanism that outputs a signal that is proportional to the displacement or movement of a moveable member. The moveable member usually referenced is the treadle 12 (pivotally mounted and moveable), however the signal is also proportional to the displacement of the pivot arm 30 (pivotally mounted and moveable).

FIG. 1 illustrates an electronic foot pedal 10 having an idle validation switch 80 fixedly installed to the underside of the treadle 12. The switch 80 is a single pole-single throw switch. One side of the switch functions to provide a logic signal which validates idle operation only. The other side of the switch validates throttle operation. The switch 80 is interconnected to the movement of the treadle 12 such that the initial movement of the treadle changes the switch position from idle validation to throttle validation. The switch transition points are defined by the engine manufacturer and therefor adjustability of the transition point is provided.

The switch 80 in addition to providing a smooth transition from idle mode to throttle mode provides a back up in the event of an electrical fault occurring that produces an unwanted throttle condition, such as a non-demanded acceleration of the engine.

Upon the occurrence of an in-range electrical fault, the operator may return to the idle mode by merely releasing the treadle 12. The return springs 50 (FIG. 2) pivot the treadle 12 to the home position activating the switch 80 to provide an idle validation signal. The idle validation signal overrides the signal from the potentiometer circuit, regardless of amplitude.

As shown in FIG. 1, the switch 80 is fixedly mounted to the underside of the treadle 12 by fasteners 82.

The switch 80 has a moveable plunger 84 for activating the switch 80 in a conventional manner. The plunger 84 is spring biased to move outwardly from the switch 80. A roller 86 is rotatably mounted on the end of the plunger and is in contact with a cam surface 88 provided on an adjusting screw 90. The adjusting screw 90, which is preferably of the self-locking type, is threadably installed in a threaded bore of the pivot arm 30.

The adjusting screw 90 provides adjustment for the activation of the switch 80 by moving the cam surface 88 relative to the roller 86 on plunger 84.

As the treadle 12 is pivoted from its home position toward the base 14, the pivot arm 30 is pivoted and as a result the cam surface 88 is moved relative to the roller 86 on plunger 84. The roller 86 is urged against the cam surface 88 by the biasing force urging the plunger to move outwardly from the switch 80. As the roller 86 follows the cam surface 88, the plunger 84 moves outwardly, and the switch 80 will be activated to change from idle validation to throttle operation mode.

As the treadle 12 is pivoted toward the home position, the cam surface 88 acting on the roller 86 will be forcing the plunger 84 toward the switch to activate the switch to change from throttle operation to idle validation mode.

While a preferred embodiment of an electronic foot pedal is described and illustrated, it will be apparent to those skilled in the art that variations are possible without departing from the true spirit and scope of the invention.

The invention is therefore not to be limited to embodiments described and illustrated but is to be determined by the appended claims.

What is claimed is:

1. An electronic foot pedal adapted for controlling speed of a vehicle engine, comprising:
a base, a treadle moveable between a first position and a second position relative to the base, a member coupled to said treadle and responsive to pivotal movement of said treadle for outputting a varying signal proportional to the movement of said treadle between said first and second positions;
means associated with said treadle for yieldably biasing said treadle toward said first position;
an idle validation switch independent of said member and fixedly mounted to said treadle, a combination plunger and cam responsive to pivotal movement of the treadle to effect axial movement of the plunger, said switch activated by said axial movement of the plunger to override the varying signal of said member only with the treadle positioned at the first position, adjusting means associated with said combination plunger and cam to adjust relative positions of the plunger and cam for coordinating the point of activation of the switch with the position of the treadle only at the first position.

2. An electronic foot pedal as defined in claim 1 wherein a pivot arm has one end pivotally connected to said treadle and the other end engaging said base and cooperatively arranged whereby pivotal movement of the treadle relative to the base forces pivotal movement of the pivot arm relative to the treadle, said cam mounted to said pivot arm and cooperatively arranged relative to the plunger whereby pivotal movement of the pivot arm forces cam actuation of the plunger.

3. An electronic foot pedal as defined in claim 2 wherein said cam is adjustably mounted to said pivot arm for adjusting the axial movement of the plunger and thereby the point of actuation of the switch.

* * * * *

UNITED STATES PATENT AND TRADEMARK OFFICE
CERTIFICATE OF CORRECTION

PATENT NO. : 5,237,891

DATED : August 24, 1993

INVENTOR(S) : Lundberg, et al

It is certified that error appears in the above-indentified patent and that said Letters Patent is hereby corrected as shown below:

On the title page, item [54] and in column 1, lines 2 and 3, change "ELECTRONIC FOOT PEDAL HAVING IMPROVED BIASING ARRANGEMENT" to --AN ELECTRONIC FOOT PEDAL WITH ADJUSTABLE VALIDATION SWITCH--.

Signed and Sealed this

Fifteenth Day of March, 1994

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,237,891
DATED : August 24, 1993
INVENTOR(S) : Chester E. Lungberg, et a;

It is certified that error appears in the above-indentified patent and that said Letters Patent is hereby corrected as shown below:

On the title page: Item [75] Inventors: Chester E. Lundberg, Keith A. Neubauer, Christopher D. Nordeen, should read -- Keith A. Neubauer, Christopher D. Nordeen --.

Signed and Sealed this

Twelfth Day of April, 1994

Attest:

BRUCE LEHMAN

*Attesting Officer*   *Commissioner of Patents and Trademarks*